Patented June 27, 1933

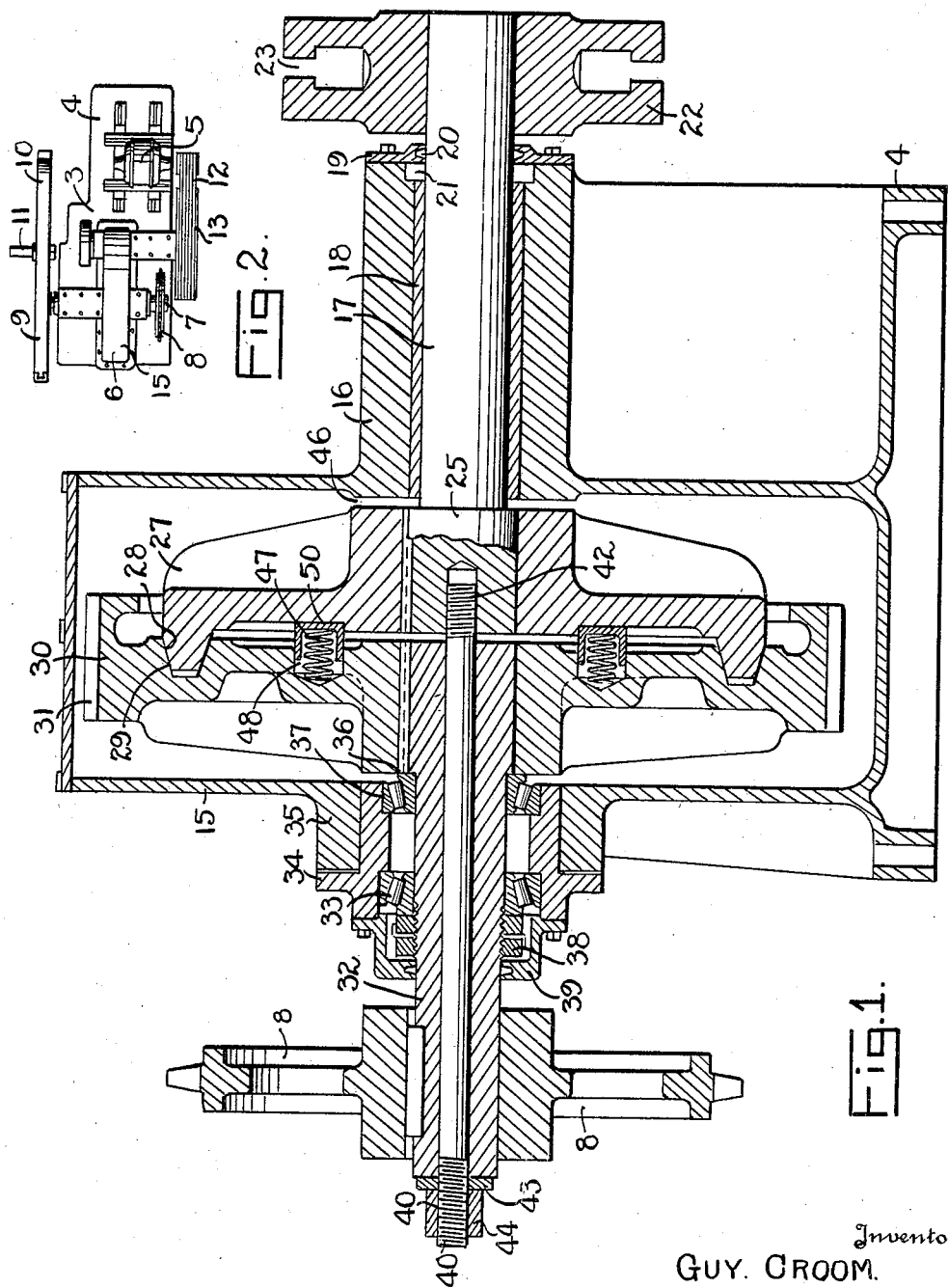

1,915,519

UNITED STATES PATENT OFFICE

GUY CROOM, OF LUFKIN, TEXAS, ASSIGNOR TO LUFKIN FOUNDRY & MACHINE COMPANY, A CORPORATION

PUMPING UNIT WITH FRICTION CLUTCH

Application filed May 26, 1931. Serial No. 540,090.

The invention relates to an improvement in pumping unit mechanisms, particularly of the type used in and about oil wells for operation of the pump and particularly includes a friction clutch for the crank arm drive which will permit release of the crank arm so that the pumping unit gears may be used for pulling rods and tubing.

With the advent of counterbalanced pumping units it was of particular advantage to adjust the counterweights or to remove them from the crank arm in order that the well might be serviced by removing the rods and tubing or pump and re-inserting them in the well. When a well is being pumped it is usual to remove the power unit which has been used in drilling the well and to substitute therefor a small power unit which is used for driving the pumping mechanism. Inasmuch as the servicing of the well calls for the rapid removal of the rods and tubing from the well it becomes necessary to drive the power mechanism at a rapid rate. If the counterbalanced crank is present an enormous eccentric load is carried by the crank shaft and this load may seriously interfere with operation of the power unit during the servicing operation.

It is, therefore, one of the objects of the invention to provide a mechanism which will release the counterbalance weights and crank shaft from the driving gears of the pumping unit so that the gear may be used independently of the crank shaft.

Another object of the invention is to provide an improved clutch mechanism which is disposed within the gear unit housing and which may be readily disconnected to release the crank arm and counterbalance weights.

Another object of the invention is to provide a driving gear for pumping unit devices which is adapted to receive a clutch to drive the crank shaft and crank arm.

A still further object of the invention is to provide a two-piece crank shaft for pumping unit mechanisms which portions of the crank shaft are adapted to be connected together by a clutch mechanism.

A still further object of the invention is to provide anti-friction bearings for the portion of the crank shaft which supports the gear and to provide a sleeve bearing for that portion of the crank shaft which supports the crank arm so that the crank arm section of the shaft may slide laterally in order to permit engagement and disengagement of the clutch.

A still further object of the invention is to provide an operative device for manipulation of the clutch, which device extends through a portion of the crank shaft.

Another object of the invention is to provide a clutch mechanism which will permit the circumferential adjustment of the crank arm with respect to the drive gear so that the crank arm may be connected to the gears at various circumferential positions in order to evenly distribute the wear on the gears.

Other and further objects of the invention will be readily apparent to those skilled in the art when the following description is considered in connection with the accompanying drawing wherein Fig. 1 is a central vertical sectional view taken through the gear unit housing and illustrating the arrangement of the parts.

Fig. 2 is a top plan view of the general assembly of a pumping unit mechanism.

The present invention relates to somewhat the same subject matter as the application, Serial No. 540,084 of Walter C. Trout, filed of even date herewith.

It is to be understood that the invention may be applied to the standard herringbone or worm gear pumping units of a type now well known in the oil field industry. Such a unit is illustrated generally in Fig. 2 by the reference character 3 and includes a base 4, a power unit 5, and a gear reduction unit 6, which serves to rotate the crank shaft 7. This crank shaft has mounted on one end thereof a sprocket 8, which is adapted to receive the chain or other drive element to furnish power for pulling rods and tubing and in servicing the well. The opposite end of the crank shaft 7 contains the crank arm 9, which carries the counterweights 10 and serves to rotate the wrist pin 11, to which the pitman rod, walking beam and sucker rods are connected.

The connection between the power unit 5 and crank shaft 7 includes a driving connection 12, which is received upon the drive wheel 13. This drive wheel is mounted on a stub shaft which carries the usual reduction gears to reduce the speed of rotation of the power unit so that it may be applied to the crank shaft 7. The last large drive gear of the reduction unit is preferably contained in the housing 15 which forms a part of the unit.

Fig. 2 shows a housing 15 and the arrangement of the internal construction thereof. This housing forms a part of the base 4 and is upstanding therefrom. The housing preferably forms a bearing support 16 for the crank arm side of the crank shaft. This crank shaft is illustrated at 17 and extends through the bearing 16 and is separated therefrom by a bearing sleeve 18. This bearing sleeve may be held in position by means of a bearing cap 19, which is attached to the end of the bearing 16. This cap may carry the packing ring 20 to seal about the shaft.

A cavity 21 is provided in the end of the bearing so that a quantity of lubricant may be placed therein if desired. The crank arm is shown in section at 22 and is preferably keyed to the crank arm shaft 17. It is to be understood that any desired type of crank arm may be provided but the one here illustrated is of a type well known and is designated as the Lufkin counterbalanced crank arm, in which grooves 23 are provided to receive a flange on the counterbalance weight, so that the weight may be adjusted longitudinally of the crank arm. With the present mechanism including the releasing clutch it may be desirable to use a simple type of counterbalanced crank in which the weight may be formed integral with the crank or may be adjustable with respect to the crank as desired.

The inner end of the crank arm shaft 17 is enlarged slightly as at 25 in order to receive the hub 26 of the clutch ring 27. It is to be understood that this clutch ring may be of any desired type, but for purposes of illustration a double cone surface clutch 28 has been illustrated. This double cone surface is arranged to be received within the double tapered groove 29 in the drive gear 30. If desired, the base of this groove 29 may be provided with alternate grooves and ribs and the tip of the cone be provided with teeth which are adapted to rest in the grooves so that a more or less positive connection in the nature of a dental clutch will be provided when the clutch is clamped in position.

The drive gear 30 is provided on its outer periphery with the gear teeth 31, which engage the next reduction gear in the gear train enclosed in the housing 15 and form a part of the gear unit 6. This gear 30 is preferably keyed to the gear shaft 32, which is in the nature of an extension of the crank arm shaft 17, and is arranged coaxially with the crank arm shaft 17. This gear shaft 32 is mounted in the anti-friction bearings 33 carried by a bearing support 34, which is in turn mounted in the hub 35 of the housing 15. In order to position this gear shaft 32 so that it will not have any horizontal play, a shoulder 36 is provided which is adapted to abut against the inner anti-friction bearing 37. Beyond the outer anti-friction bearing is a locking sleeve 38 which is threaded to the shaft and arranged to abut against the outer anti-friction bearing. As illustrated, the bearings 33 and 37 are of a type which are inclined with respect to the longitudinal axis of the shaft so that each bearing will absorb the thrust in a lateral direction.

A cap 39 is provided on the end of the bearing support 34 to house the locking ring and eliminate dust and grit from the bearing. This gear shaft 32 extends upwardly from the housing and has keyed thereto the sprocket wheel 8, which is adapted to serve as the driving element for the draw works or other device used in servicing the well.

In order that the clutch 27 may be engaged and disengaged an operative mechanism 40 has been provided, which includes the clutch shaft 41 which extends through the gear shaft 32 and is threaded into the cavity 42 in the end of the crank arm shaft 17. This rod or shaft 41 is adapted for sliding movement and rotation within the gear shaft 32. A washer 43 is provided to abut against the end of the gear shaft 32 and to receive the thrust or lock nut 44. Thus when it is desired to draw the clutch 27 aside into engagement with the gear 30 a wrench or tool may be used on the nut 44, which is threaded to the shaft 41 and the nut may be drawn up so that the shaft 41 moves to the left through the gear shaft 32 and draws the clutch disc 27 into engagement with the gear 30. In this manner the shafts 17 and 32 are locked together and the entire device will rotate as a unit, causing rotation of the crank arm 22, reciprocation of the walking beam connected to the crank and operation of the pump in the well. When, however, it is desired to service the well the nut 44 will be unscrewed to release the shaft 41 and release the clutch 27 from engagement with the gear 30. This releasing allows horizontal sliding movement of the shaft 17 so that the hub 26 moves away from the gear 30. The space 46 between the hub 26 and the housing 15 may be made of sufficient distance to permit this lateral movement. In event the gear 30 is now rotated the crank shaft 17, the crank arm 22, and the rod 41 will remain stationary, the shaft 32 and the sprocket 8, however, will rotate as they are keyed as a unit. This allows a great economy in the power necessary in servicing the well as it releases the enormous load of the counterbalanced crank.

In order that release of the clutch 27 from the gear 30 will be assured a plurality of coil springs 47 have been provided in the cavities 48 formed in the gear 30. Each of these springs carries a contact cap 50 which is arranged to ride on the inner face of the clutch disc 27. Thus when the nut 44 is released the pressure of the springs 47 will cause release of the clutch. If, however, the clutch does not release in this manner force may be applied to the end of the rod 41 or between the crank arm 22 and the end of the bearing 16 to assist in releasing the clutch so that it will slide laterally away from the gear 30. The weight of the counterbalanced arm 22 assists in the release of the clutch due to its enormous eccentric load, and when the nut 44 is released to release the clutch, if the clutch does not release, a slight application of power to rotate the crank 30 will cause release of the clutch due to the enormous load on the crank arm.

While the invention has been shown and described as embodying a clutch of the double-cone type for engagement with the crank it is to be understood that various forms of connections may be resorted to without departing from the spirit of the invention which broadly contemplates the release of the crank arm from the driving gear.

What I claim is:—

1. A pumping unit including a power unit, reduction gears connected therewith, a crank shaft, means connecting said crank shaft and said gears whereby said shaft may be engaged or disengaged from said gears, said means including structure for causing axial movement of said crank shaft relative to said gears.

2. A pumping unit including a power unit, reduction gears connected therewith, a slidable crank shaft, and means connecting said crank shaft and said gears whereby said shaft may be engaged or disengaged from said gears by sliding movement, said means including cone clutch members, one of which is fixed to said shaft and the other being embodied in one of said gears.

3. A pumping unit including a power unit, reduction gears connected therewith, a slidable crank shaft, a crank arm thereon, means connecting said crank shaft and said gears whereby said shaft may be engaged or disengaged from said gears, said means including a cone clutch embodied in one of said gears, and means adapted to engage or release said clutch by axially sliding said crank shaft.

4. An oil well pumping unit including a crank shaft, driving gears for said crank shaft, a clutch fixed on said crank shaft but releasably connecting said crankshaft and said gears, and means to operate said clutch by axial sliding movement of said crank shaft.

5. An oil well pumping unit including a crank arm, a crank shaft on which said arm is mounted, driving gears for said crank shaft, means releasable by relative sliding movement between said crank shaft and said gears to release said crank arm, a housing for said gears, said means being disposed in said housing.

6. An oil well pumping unit including a crank shaft, driving gears for said crank shaft, means releasably connecting said crank shaft and said gears, a housing for said gears, said means being disposed in said housing, and additional means extending from said housing to operate said first means to release or engage said crank shaft and gears by causing relative axial movement of said crank shaft.

7. A pumping unit including in combination a housing, a gear therein, a crank shaft and a gear shaft mounted in said housing and adapted to be rotated by said gear, clutch means connecting said shafts to rotate as a unit but releasable so that said crank shaft may remain idle and including a rod co-axial with said shafts.

8. A pumping unit including in combination a housing, a gear therein, a crank shaft and a gear shaft mounted in said housing and adapted to be rotated by said gear, clutch means connecting said shafts to rotate as a unit but releasable so that said crank shaft may remain idle, said means including a clutch disc connected to said crank shaft and engageable with said gear, and means to operate said clutch means including a rod extending through said gear shaft and connected to said crank shaft, whereby rotation of the rod will cause axial movement of said crank shaft.

9. A pumping unit including in combination a housing, a gear therein, a crank shaft and a gear shaft mounted in said housing and adapted to be rotated by said gear, clutch means connecting said shafts to rotate as a unit but releasable so that said crank shaft may remain idle, said means including a clutch disc connected to said crank shaft and engageable with said gear, and means carried by said gear shaft and projecting axially therefrom to operate said clutch means.

In testimony whereof I hereunto affix my signature this 21st day of May, A. D. 1931.

GUY CROOM.